(12) United States Patent
Hashiba et al.

(10) Patent No.: US 7,531,931 B2
(45) Date of Patent: May 12, 2009

(54) PERMANENT-MAGNET GENERATOR

(75) Inventors: Mitsuharu Hashiba, Tokyo (JP);
Nobuhiro Kihara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 401 days.

(21) Appl. No.: 11/374,165

(22) Filed: Mar. 14, 2006

(65) Prior Publication Data
US 2007/0108851 A1     May 17, 2007

(30) Foreign Application Priority Data
Nov. 14, 2005    (JP)    ............................ P2005-328976

(51) Int. Cl.
| H02K 21/22 | (2006.01) |
| H02K 1/32 | (2006.01) |
| H02K 9/00 | (2006.01) |
| H02K 7/04 | (2006.01) |

(52) U.S. Cl. ............................ 310/153; 310/58; 310/61; 310/74

(58) Field of Classification Search ................. 310/153, 310/61, 58, 74
See application file for complete search history.

(56) References Cited

U.S. PATENT DOCUMENTS

| 6,429,564 | B1 * | 8/2002 | Uemura et al. ............... 310/153 |
| 6,661,132 | B2 * | 12/2003 | Kobayashi ..................... 310/51 |
| 7,012,349 | B1 * | 3/2006 | Walker ..................... 310/156.19 |
| 7,078,841 | B2 * | 7/2006 | Yokota ........................ 310/153 |
| 7,145,274 | B2 * | 12/2006 | Uemura et al. ................ 310/74 |
| 2003/0062787 | A1 * | 4/2003 | Kobayashi ............. 310/156.12 |
| 2004/0164628 | A1 | 8/2004 | Serizawa et al. |

FOREIGN PATENT DOCUMENTS

| DE | 22 55 271 C2 | 5/1974 |
| DE | 699 00 128 T2 | 7/2001 |
| DE | 101 11 952 A1 | 8/2002 |
| DE | 602 06 829 T2 | 5/2006 |
| JP | 61-236350 A | 10/1986 |
| JP | 63-202171 U | 12/1988 |
| JP | 01-157561 U | 10/1989 |

(Continued)

OTHER PUBLICATIONS

English translation of German Office Action dated Sep. 18, 2006 issued in German Application No. 10 2006 014 865.7-32.

*Primary Examiner*—Burton Mullins
(74) *Attorney, Agent, or Firm*—Sughrue Mion, PLLC

(57) ABSTRACT

A permanent-magnet generator is provided that has a bowl-shaped fly wheel integrally formed with a boss part by casting or hot forging, that reduces rotational imbalance and the quantity of balance correction processing such as drilling. The permanent-magnet generator has a bowl-shaped fly wheel produced by casting or hot forging, having a circumferential wall part and a bottom wall part, and having a boss part for supporting a rotating shaft, the boss part being integrally formed at the center of the bottom wall part. The plural vents are arranged substantially circularly in the bottom wall part of the fly wheel, and a key groove for coupling with the rotating shaft is provided at a part of the boss part. The arrangement of at least one of the plural vents is made unequal in order to reduce rotational imbalance including that caused by the key groove.

10 Claims, 5 Drawing Sheets

FOREIGN PATENT DOCUMENTS

| | | |
|---|---|---|
| JP | 11-178299 | 7/1999 |
| JP | 11-178299 A | 7/1999 |
| JP | 2000-201463 | 7/2000 |
| JP | 2003-180058 A | 6/2003 |
| JP | 2004-048971 | 2/2004 |

* cited by examiner

PERMANENT-MAGNET GENERATOR

BACKGROUND OF THE INVENTION

1. Field of the Invention

This invention relates to a fly-wheel permanent-magnet generator.

2. Description of the Related Art

In a conventional fly-wheel permanent-magnet generator, a bowl-shaped fly wheel having a magnet on the inner surface of its circumferential wall is used as a rotor. However, when the rotor rotates, an alternating field generated by the magnet causes hysteresis loss and eddy-current loss in a laminated core of a stator. The magnetic force and the quantity of imbalance of the rotor itself cause variance in the rotation locus. The rotation variance leads to variance in the rotation accuracy (quantity of air gap between the stator and the rotor) and largely affects the power generation characteristic (output characteristic).

Also, the fly-wheel permanent-magnet generator is often directly connected with a shaft of an internal combustion engine or the like, and the rotation variance from the shaft and the rotation variance of the generator itself adversely affect the shaft side. Therefore, in order to reduce the imbalance of the rotor (rotation imbalance), balancing (imbalance correction processing) is performed.

Moreover, in the fly-wheel permanent-magnet generator, generally, a vent that is as large as possible is installed to increase the ventilation efficiency. Since processing variance, variation of attached components (plural magnets are installed with a gap from each other) and the like cause a certain quantity of rotation imbalance, balance correction processing such as drilling needs to be performed many times in a later process.

To address this circumstance, in the conventional permanent-magnet generator having a fly wheel made of sheet metal, the size (area) of one or some of plural vents opened at equal spacing in the bottom wall part of the fly wheel is adjusted to maintain the rotation balance, for example, as disclosed in Patent Reference 1.

Patent Reference 1: JP-11-178299 (paragraphs 0031 and 0032, and FIG. 4)

Recently, a fly-wheel permanent-magnet generator tends to produce high output. Its fly wheel is produced by casting or hot forging, instead of using sheet metal, and is integrally formed with a central boss part of the bottom wall part. Meanwhile, multi-polarization of the core and magnet (magnetic pole) causes higher frequency, and the thickness of the generator is reduced in order to reduction in size and weight.

Therefore, it is necessary to minimize the quantity of rotation imbalance that affects the rotation rigidity.

However, if the fly wheel is produced by casting or hot forging, rotation imbalance is caused by variance in density (specific gravity) rather than dimensional variance. Therefore, it is difficult to reduce the quantity of rotation imbalance to the required level, simply by adjusting the size (area) of one or some of the vents as described above.

Moreover, even if the processing variance and the variation of attached components are addressed to improve the accuracy, it is difficult to completely eliminate the rotation imbalance, because of the influence of a key groove provided at the center of the boss part.

SUMMARY OF THE INVENTION

In view of the foregoing status of the art, it is an object of this invention to provide a permanent-magnet generator that has a bowl-shaped fly wheel integrally formed with a boss part by casting or hot forging, and that enables improvement in the quantity of rotation imbalance and significant reduction in the quantity of balance correction processing (drilling), which is necessary in a later process.

According to this invention, a permanent-magnet generator includes: a bowl-shaped fly wheel produced by casting or hot forging, having a circumferential wall part and a bottom wall part, and having a boss part for supporting a rotating shaft, the boss part being integrally formed at the center of the bottom wall part; plural magnets provided on an inner circumferential surface of the circumferential wall part of the fly wheel; and a generating coil wound on a laminated core arranged to face the magnets. Plural vents are arranged with spacing from each other substantially circularly in the bottom wall part of the fly wheel, and a key groove to be coupled with the rotating shaft is provided at a part of the boss part. Arrangement of at least one of the plural vents is made unequal in order to reduce the quantity of rotation imbalance including that caused by the key groove.

According to this invention, in the permanent-magnet generator having the fly wheel and the boss part integrally produced by casting or hot forging, the arrangement of at least one of the plural vents arranged in the bottom wall part of the fly wheel is made unequal. Thus, the quantity of rotation imbalance including that caused by the key groove formed in the boss part can be reduced and the quantity of balance correction processing (drilling), which is necessary in a later process, can be reduced.

DETAILED DESCRIPTION OF THE PREFERRED EMBODIMENTS

Embodiment 1

Embodiment 1 of this invention will now be described with reference to FIGS. 1 to 4.

Figure 1:
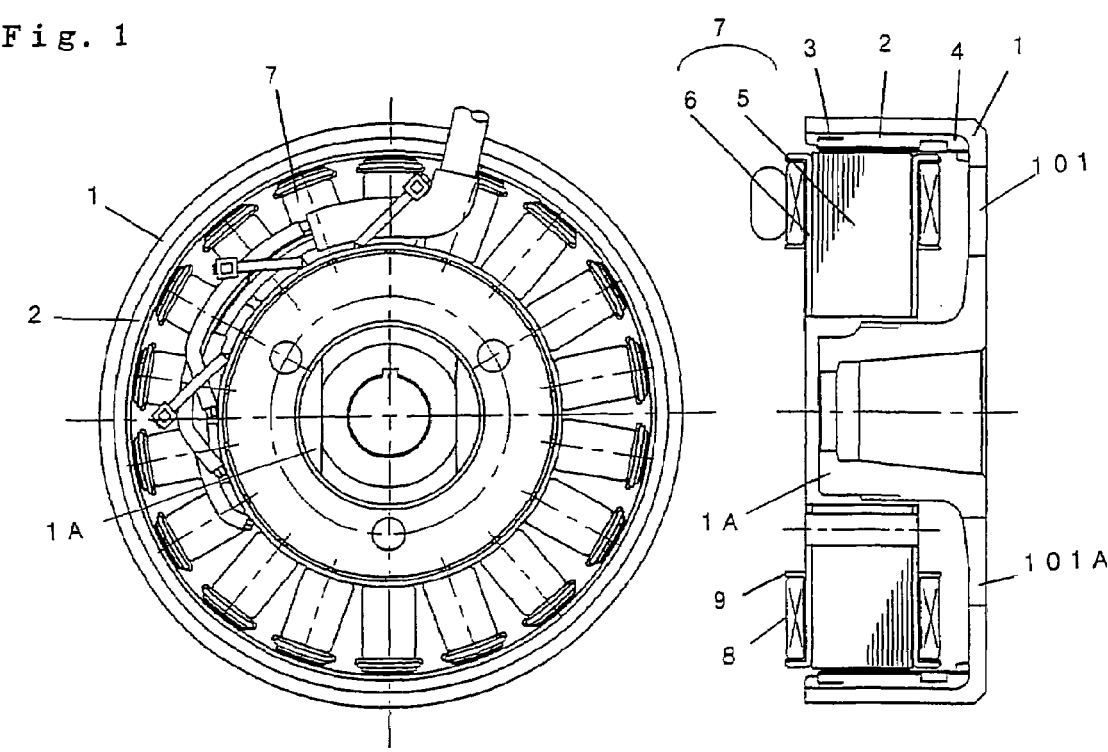
FIG. 1 is a plan view and longitudinal sectional view showing a permanent-magnet generator according to Embodiment 1 of this invention.

FIG. 1 is a plan view and longitudinal sectional view showing a permanent-magnet generator according to Embodiment 1. Numeral 1 represents a bowl-shaped fly wheel having a circumferential wall part and a bottom wall part. The fly wheel is produced by casting or hot forging. A boss part 1A having a key groove 1B formed therein is integrally formed at the center of the bottom wall part. The key groove 1B functions for connection with and rotation stop of a rotating shaft of an internal combustion engine or the like. The key groove 1B is processed at the center of the boss part 1A.

Numeral 2 represents plural magnets provided in the circumferential direction on the circumferential wall part of the fly wheel 1. Numeral 3 represents a cylindrical production ring adhering to and fitted with the inner side of the. circularly provided magnets 2. Numeral 4 represents a resin or mold material that fills the spaces on both lateral sides of the magnets 2 and the spaces between the ends of the individual magnets 2, and that integrally fixes the magnets 2 and the protection ring 3 to the fly wheel 1.

Numeral 5 represents plural thin steel plates (mid plates) provided on the inner side of the fly wheel 1 to face the magnets 2. Numeral 6 represents edge plates situated on both lateral sides of the thin steel plates 5. Numeral 7 represents a laminated core including the plural thin steel plates 5 and edge plates 6, which is fixed to the case or the like of the internal combustion engine. Numeral 8 represents a generating coil wound on the laminated core 7. Numeral 9 represents an insulating material (for example, resin mold material or epoxy-based powder coating) for securing insulation between the laminated core 7 and the generating coil 8.

The fly wheel 1 and the magnets 2 form a rotor. The laminated core 7 and the generating coil 8 form a stator. Generated output is taken out from the generating coil 8.

Figure 2:
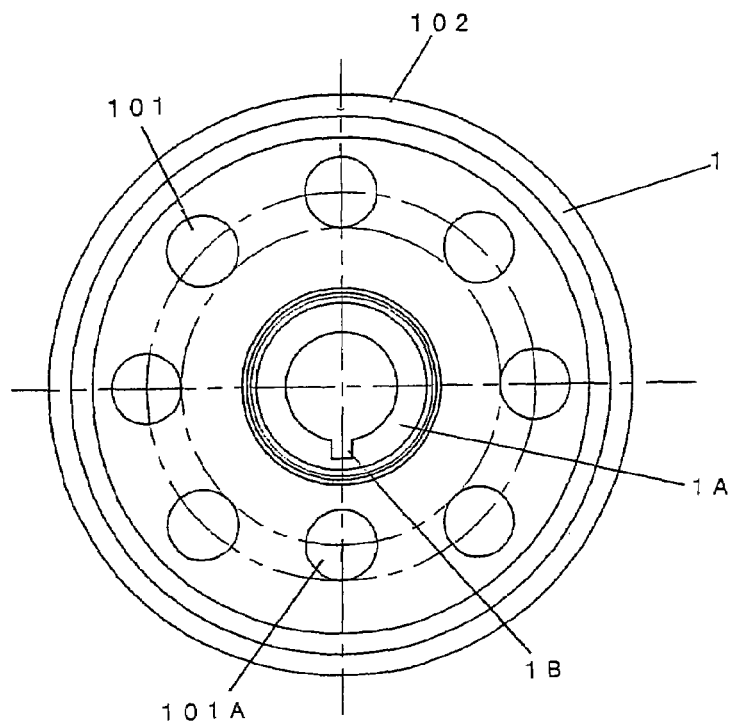
FIG. 2 is a plan view showing an exemplary fly wheel in Embodiment 1.

Numeral 101 represents plural vents formed in the bottom wall part of the fly wheel 1. As shown in FIG. 2, the vents 101 are arranged substantially circularly with spacing from each other, and a vent 101A, which is one of the vents, is arranged unequally to the other vents in order to reduce the quantity of rotation imbalance including at least that caused by the key groove 1B.

That is, the vent 101A is arranged to offset the positional deviation (weight deviation) of the normally arranged vents 101 and attached components, and to reduce the quantity of rotation imbalance including that caused by the key groove 1B. The vent 101A functions for reducing the weight, in addition to improving the balance (reduce the number of drilled holes for balance correction) and the cooling property.

Numeral 102 represents a drilled part for balance correction carried out after the final assembly.

Figure 3:
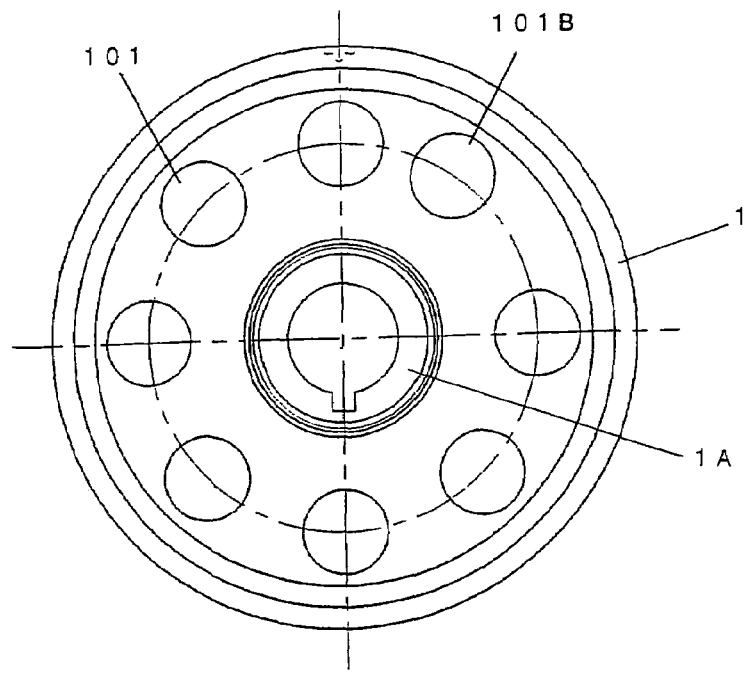
FIG. 3 is a plan view showing another exemplary fly wheel in Embodiment 1.

As for the way to unequally arrange the vents 101, the vent 101A, which is a part facing the key groove 1B of the plural vents 101 formed in the bottom wall part of the fly wheel 1, may be arranged more closely to the key groove 1B, as shown in FIG. 2, or alternatively, the arrangement space (pitch) of a vent 101B, which is one of the vents, can be changed as shown in FIG. 3.

Figure 4:
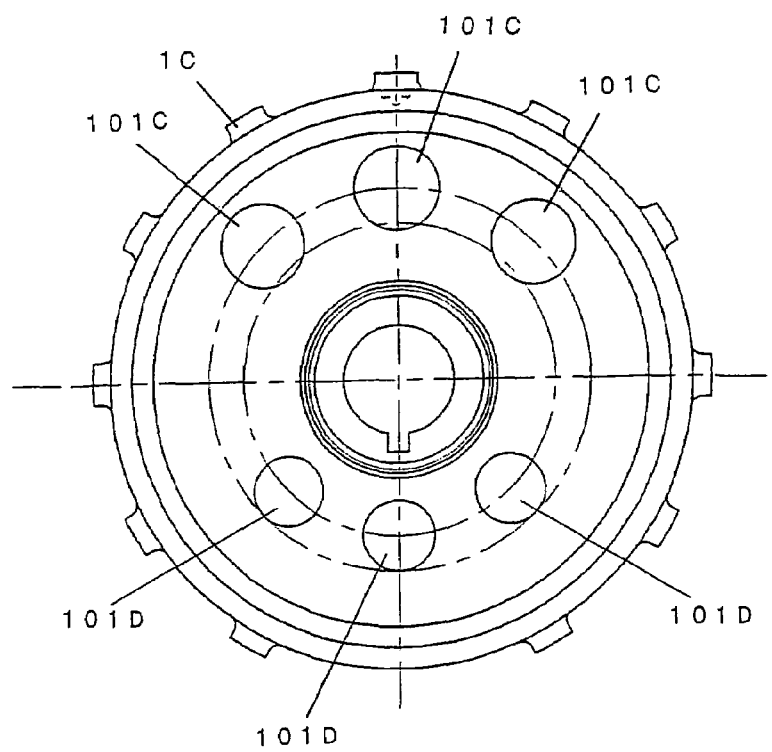
FIG. 4 is a plan view showing another exemplary fly wheel in Embodiment 1.

Moreover, if rotating position detecting protrusions (trigger pole) 1C used for recognizing ignition timing of the internal combustion engine are formed on the outer circumferential surface of the circumferential wall part of the fly wheel 1, as shown in FIG. 4, the arrangement and size of vents 101C and 101D may be adjusted to control rotation balance including that caused by the rotating position detecting protrusions 1C.

Figure 5:
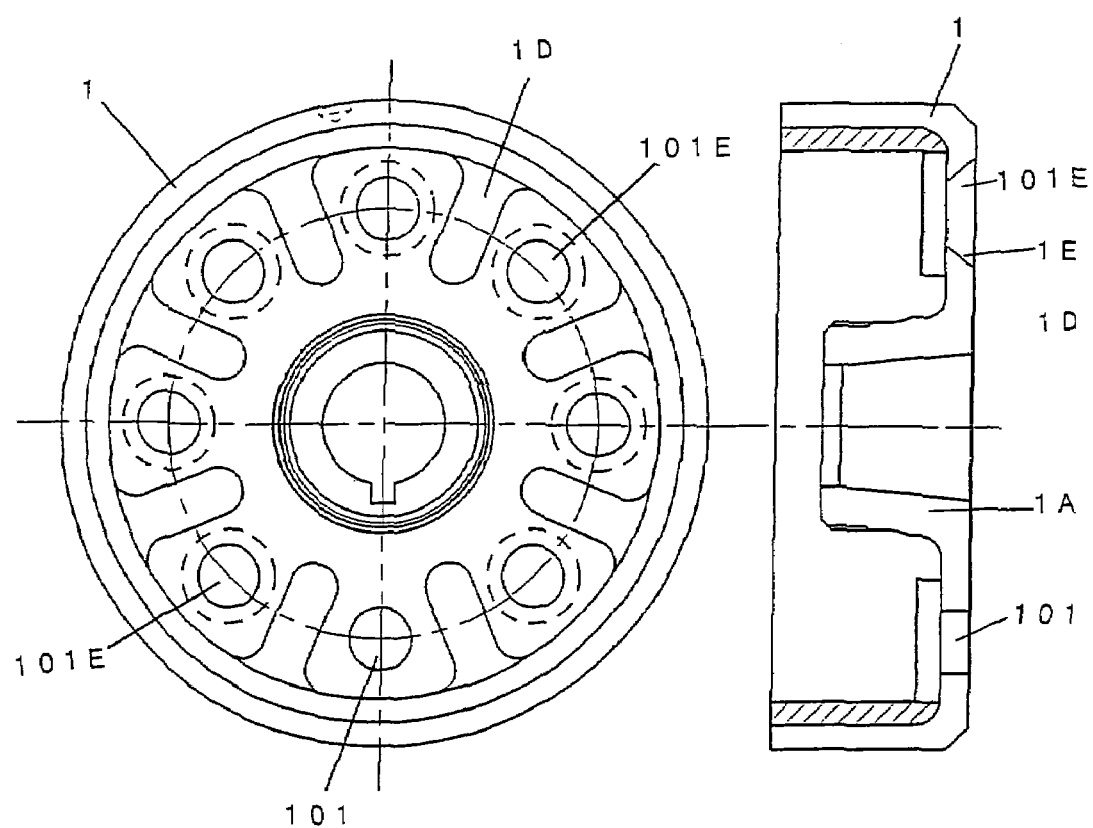
FIG. 5 is a plan view and longitudinal sectional view showing another exemplary fly wheel in Embodiment 1.

Alternatively, if the fly wheel 1 in which plural ribs 1D are arranged substantially radially between the plural vents to improve the rotation rigidity is used, as shown in FIG. 5, an inclined part 1E may be formed in a vent 101E, which is one of the vents, in order to reduce the quantity of rotation imbalance including that caused by the key groove 1B.

As described above, according to Embodiment 1, the permanent-magnet generator has the bowl-shaped fly wheel 1 produced by casting or hot forging, having the circumferential wall part and the bottom wall part, and having the boss part 1A for supporting the rotating shaft, the boss part 1A being integrally formed at the center of the bottom wall part. The plural vents 101 are arranged substantially circularly with spacing from each other in the bottom wall part of the fly wheel 1, and the key groove 1B for coupling with the rotating shaft is provided at a part of the boss part 1A. The arrangement of at least one of the plural vents 101 is made unequal in order to reduce the quantity of rotation imbalance including that caused by the key groove 1B. Thus, the quantity of rotation imbalance including that caused by the key groove 1B can be accurately reduced.

Also, as the rotation balance of the fly wheel improves, the number of drilled holes for balancing in the later process is reduced accordingly and the productivity can be improved. At the same time, reduction in the thickness due to drilling is restrained and the rotation balance can be secured without lowering the rotation rigidity.

With respect to the fly wheel produced by casting or hot forging, an example of comparison between the conventional product and the improved product in which the quantity of rotation imbalance including that caused by the key groove is reduced according Embodiment 1 will now be described. In the conventional product, after balance correction processing (drilling) is performed on the fly wheel alone, further balance correction processing needs to be performed on the fly wheel with the components attached thereto. Therefore, the total number of drilled holes is approximately 13 or 14. However, in the improved product, balance correction processing need not be performed on the fly wheel alone and it suffices to perform balance correction processing on the fly wheel with the components attached thereto. Therefore, the number of drilled holes can be reduced to 1 to 3.

Embodiment 2

FIGS. 6 to 9 show a case of applying a fly wheel with a reduced thickness for reduction in size and weight, as Embodiment 2. Instead of vents, plural recessed parts 201 are arranged substantially circularly with spacing from each other on the inner surface of the bottom wall part of the fly wheel 1, and the shape or arrangement spacing (pitch) of at least one of the plural recessed parts 201 is made unequal in order to reduce the quantity of rotation imbalance including that caused by the key groove 1B.

Figure 6:
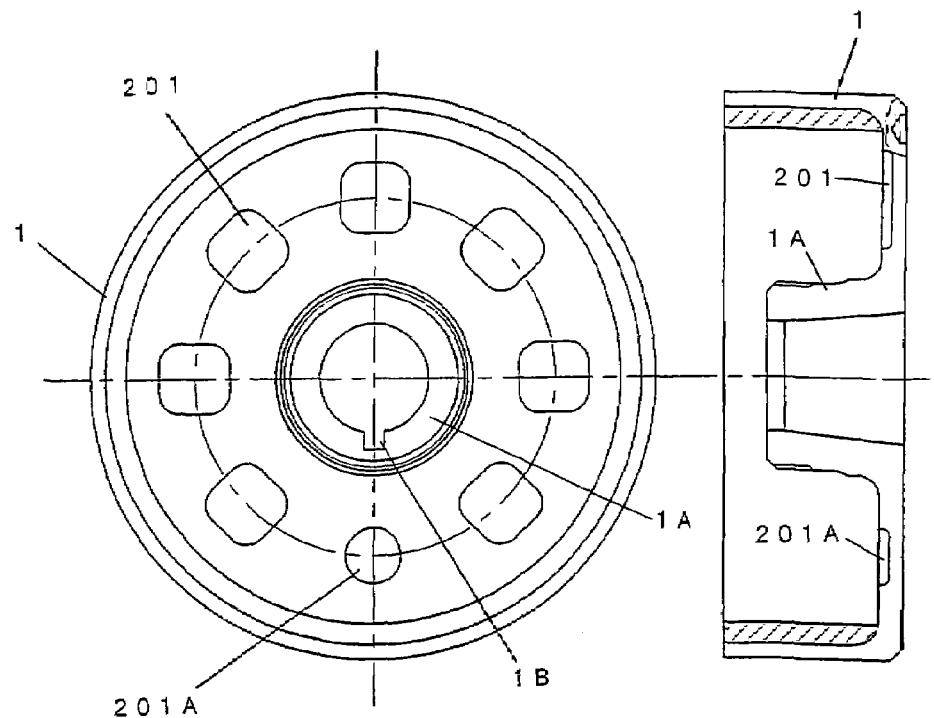
FIG. 6 is a plan view and longitudinal sectional view showing an exemplary fly wheel in Embodiment 2.
Figure 7:
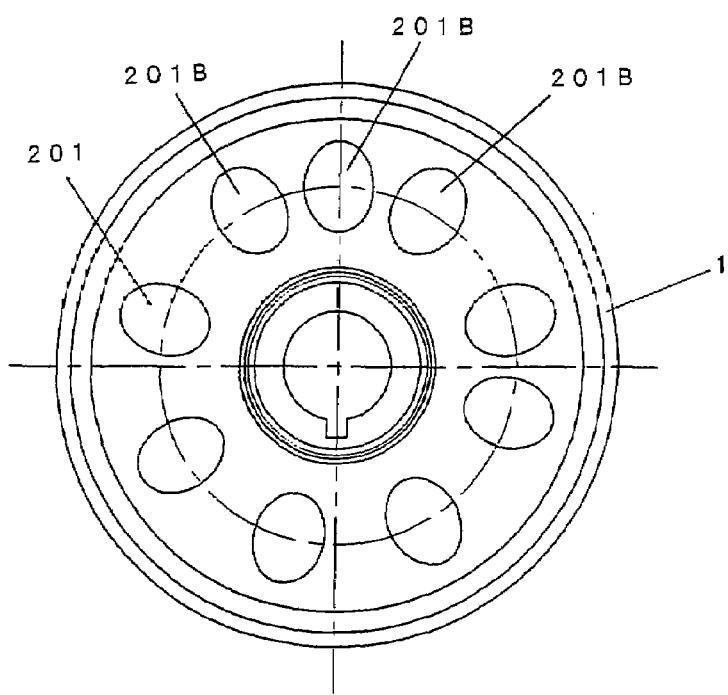
FIG. 7 is a plan view showing another exemplary fly wheel in Embodiment 2.
Figure 8:
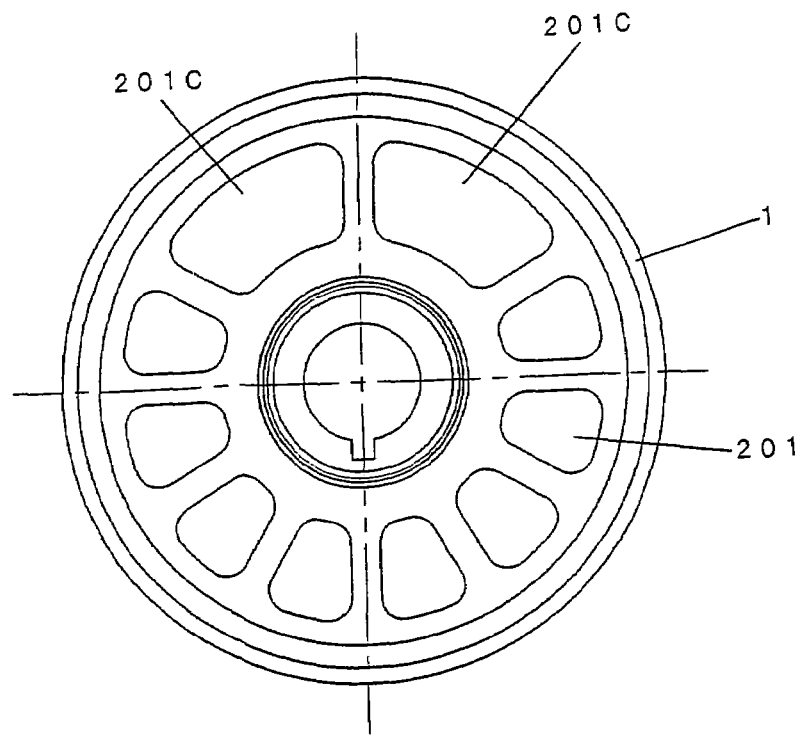
FIG. 8 is a plan view showing another exemplary fly wheel in Embodiment 2.
Figure 9:
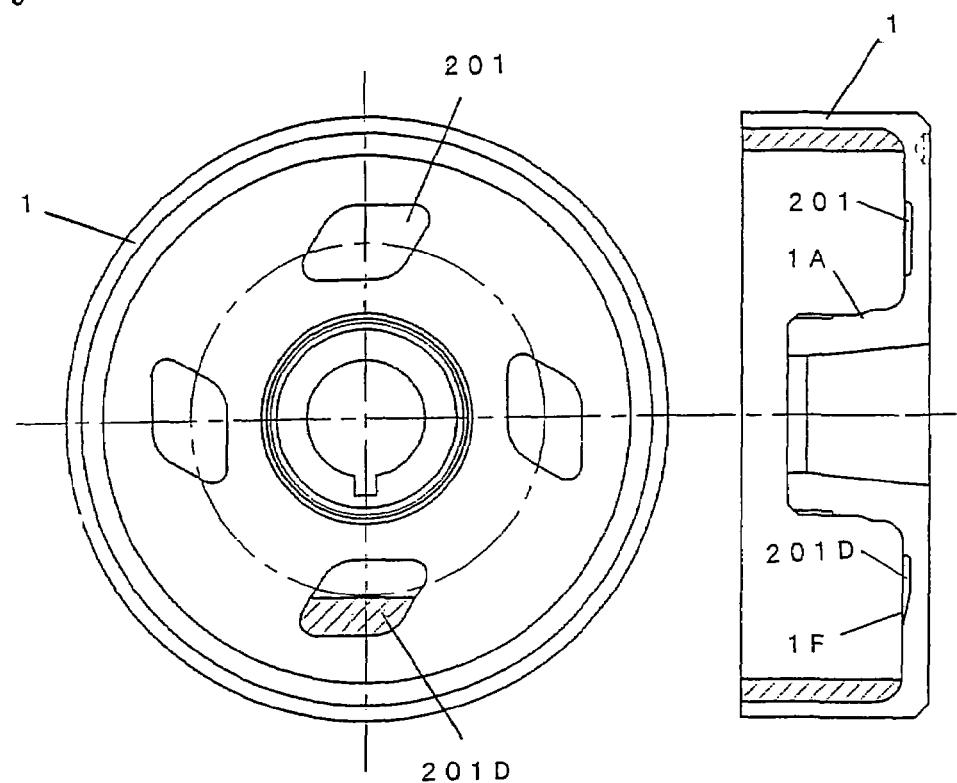
FIG. 9 is a plan view and longitudinal sectional view showing another exemplary fly wheel in Embodiment 2.

FIG. 6 shows an example in which the shape of a recessed part 201A facing the key groove 1B, which is one of the recessed parts. FIG. 7 shows an example in which the arrangement spacing (pitch) of a recessed part 201B, which is one of the recessed parts, is changed. FIG. 8 shows an example in which the area of a recessed part 201C, which is one of the recessed parts, is increased. FIG. 9 shows an example in which an inclined surface 1F is formed at the bottom of a recessed part 201D facing the key groove, which is one of the recessed parts.

As described above, according to Embodiment 2, the permanent-magnet generator has the bowl-shaped fly wheel 1 produced by casting or hot forging, having the circumferential wall part and the bottom wall part, and having the boss part 1A for supporting the rotating shaft, the boss part 1A being integrally formed at the center of the bottom wall part. The recessed parts 201 are arranged substantially circularly with spacing from each other on the inner surface of the bottom wall part of the fly wheel 1, and the shape or arrangement spacing (pitch) of at least one of the plural recessed parts 201 is made unequal in order to reduce the quantity of rotation imbalance including that caused by the key groove 1B. Thus, the quantity of rotation imbalance including that caused by the key groove 1B can be accurately reduced, and the balance correction processing (drilling) time, which is necessary in the later process, can be reduced. Substantially the same effects as in Embodiment 1 can be achieved.

By forming the recessed parts that do not affect the rigidity, it is possible to easily apply Embodiment 2 to a case where the thickness of the fly wheel is reduced further for reduction in size and weight and the vent processing itself is avoided.

What is claimed is:

1. A permanent-magnet generator comprising:
a bowl-shaped fly wheel produced by casting or hot forging, having a circumferential wall part and a bottom wall part, and having a boss part for supporting a rotating shaft, the boss part integrally formed at the center of the bottom wall part;
plural magnets provided on an inner circumferential surface of the circumferential wall part of the fly wheel; and
a generating coil wound on a laminated core arranged to face the magnets,
wherein plural vents are arranged substantially circularly in the bottom wall part of the fly wheel, and a key groove coupled with the rotating shaft is provided at a part of the boss part, and
wherein arrangement of the plural vents is asymmetric with respect to centers of the plural vents.

2. The permanent-magnet generator as claimed in claim 1, wherein circumferential spacing between the centers of the plural vents is not uniform.

3. The permanent-magnet generator as claimed in claim 1, further comprising plural rotating position detecting protrusions on an outer circumferential surface of the bottom wall part of the fly wheel and along the circumferential direction, wherein the circumferential spacing between the centers of the plural vents is non uniform.

4. The permanent-magnet generator as claimed in claim 1, further comprising plural rotating position detecting protrusions on an outer circumferential surface of the bottom wall part of the fly wheel and along the circumferential direction, wherein the vent or vents near the key groove are closer to the boss than other vents.

5. The permanent-magnet generator as claimed in claim 1, wherein the vents are uniform in size.

6. The permanent-magnet generator as claimed in claim 1, wherein at least one of the vents is repositioned, breaking symmetry in the circular arrangement of the vents.

7. A permanent-magnet generator comprising:
a bowl-shaped fly wheel produced by casting or hot forging, having a circumferential wall part and a bottom wall part, and having a boss part for supporting a rotating shaft, the boss part integrally formed at the center of the bottom wall part;
plural magnets provided on an inner circumferential surface of the circumferential wall part of the fly wheel; and
a generating coil wound on a laminated core arranged to face the magnets,
wherein plural vents are arranged substantially circularly in the bottom wall part of the fly wheel, and a key groove coupled with the rotating shaft is provided at a part of the boss part, and
wherein the vent facing the key groove is closer to the boss than the other vents.

8. A permanent-magnet generator comprising:
a bowl-shaped fly wheel produced by casting or hot forging, having a circumferential wall part and a bottom wall part, and having a boss part for supporting a rotating shaft, the boss part integrally formed at the center of the bottom wall part;
plural magnets provided on an inner circumferential surface of the circumferential wall part of the fly wheel; and
a generating coil wound on a laminated core arranged to face the magnets,
wherein plural vents are arranged substantially circularly in the bottom wall part of the fly wheel, and a key groove coupled with the rotating shaft is provided at a part of the boss part, and
wherein an inclined surface is provided in the other vents than the vents facing the key groove.

9. A permanent-magnet generator comprising:
a bowl-shaped fly wheel produced by casting or hot forging, having a circumferential wall part and a bottom wall part, and having a boss part for supporting a rotating shaft, the boss part integrally formed at the center of the bottom wall part;
plural magnets provided on an inner circumferential surface of the circumferential wall part of the fly wheel; and
a generating coil wound on a laminated core arranged to face the magnets,
wherein a key groove coupled with the rotating shaft is provided at a part of the boss part,
wherein plural recessed parts are arranged substantially circularly on an inner surface of the bottom wall part of the fly wheel, and
wherein the shape of the recessed part facing the key groove is different from the shape of the other recessed parts.

10. A permanent-magnet generator comprising:
a bowl-shaped fly wheel produced by casting or hot forging, having a circumferential wall part and a bottom wall part, and having a boss part for supporting a rotating shaft, the boss part integrally formed at the center of the bottom wall part;
plural magnets provided on an inner circumferential surface of the circumferential wall part of the fly wheel; and
a generating coil wound on a laminated core arranged to face the magnets,
wherein a key groove coupled with the rotating shaft is provided at a part of the boss part,
wherein plural recessed parts are arranged substantially circularly on an inner surface of the bottom wall part of the fly wheel, and
wherein an inclined surface is provided in the recessed part facing the key groove.

* * * * *